(12) United States Patent
Dasari et al.

(10) Patent No.: US 11,256,540 B2
(45) Date of Patent: Feb. 22, 2022

(54) SERVER-TO-CONTAINER MIGRATION (71) Applicant: MICRO FOCUS LLC, Santa Clara, CA (US)

(72) Inventors: Rajashekar Dasari, Bangalore (IN); Harish Kum Somisetty, Bangalore (IN); Stefan Bergstein, Boeblingen (DE)

(73) Assignee: MICRO FOCUS LLC, Santa Clara, CA (US)

( * ) Notice: Subject to any disclaimer, the term of this patent is extended or adjusted under 35 U.S.C. 154(b) by 233 days.

(21) Appl. No.: 16/590,852

(22) Filed: Oct. 2, 2019

(65) Prior Publication Data

US 2020/0210226 A1 Jul. 2, 2020

(30) Foreign Application Priority Data

Dec. 27, 2018 (IN) .............................. 201841049389

(51) Int. Cl.
*G06F 9/455* (2018.01)
*G06F 9/46* (2006.01)
*G06F 9/48* (2006.01)
*G06F 9/50* (2006.01)
*G06F 3/06* (2006.01)

(52) U.S. Cl.
CPC ............ *G06F 9/4856* (2013.01); *G06F 3/067* (2013.01); *G06F 3/0617* (2013.01); *G06F 3/0647* (2013.01); *G06F 9/4881* (2013.01); *G06F 9/5088* (2013.01); *G06F 2209/504* (2013.01); *G06F 2209/5022* (2013.01)

(58) Field of Classification Search
CPC .. G06F 9/4856; G06F 9/45558; G06F 9/4881; G06F 9/5088; G06F 2009/4557; G06F 3/0647; G06F 3/0617; G06F 2209/5022; G06F 2209/504
See application file for complete search history.

(56) References Cited

U.S. PATENT DOCUMENTS 7,702,903 B1* 4/2010 Roy ...................... G06F 21/105
713/158
9,223,634 B2 12/2015 Chang et al.
(Continued)

OTHER PUBLICATIONS

Edward Allen Shortnacy; Migration Strategies for Hybrid Cloud; VMware VIcloud, Architecture Tookkit for Service Providers; Version 2.9; Jan. 2018; 43 pages.
(Continued)

*Primary Examiner* — Emerson C Puente
*Assistant Examiner* — Zhi Chen (57) ABSTRACT

For each server under consideration for container migration, whether the server has a value for a first parameter that precludes the server from being migrated to a container is determined. Each server having a value that precludes the serve from being migrated to a container is removed from further consideration. For each server remaining under consideration, a value of the server for each second parameter of a number of second parameters is determined, and the values of the server for the second parameters are weighted to yield a weight for the server. The servers remaining under consideration for migration are ranked based at least on the weights for the servers, yielding an order in which the servers are to migrated.

20 Claims, 4 Drawing Sheets

(56) References Cited

U.S. PATENT DOCUMENTS

| | | |
|---|---|---|
| 9,565,129 B2 | 2/2017 | Kun et al. |
| 9,692,632 B2 | 6/2017 | Bhattacharya et al. |
| 9,736,013 B2 | 8/2017 | Markley et al. |
| 9,898,320 B2 | 2/2018 | Tarasuk-Levin et al. |
| 9,959,157 B1* | 5/2018 | Adogla ............... G06F 9/45558 |
| 2011/0085552 A1* | 4/2011 | Hong ................. H04L 12/4633 370/392 |
| 2014/0007085 A1* | 1/2014 | Campion ............... G06F 21/45 718/1 |
| 2014/0101656 A1* | 4/2014 | Zhu .................... G06F 9/45558 718/1 |
| 2015/0188839 A1* | 7/2015 | Zhang ................ G06F 9/45558 709/225 |
| 2015/0234713 A1* | 8/2015 | Shimada ................ G06F 11/20 714/19 |
| 2017/0060481 A1* | 3/2017 | Leggette ............... G06F 3/0622 |
| 2017/0310759 A1* | 10/2017 | Sridharan ............... H04L 67/14 |
| 2017/0373933 A1 | 12/2017 | Subramanian et al. |
| 2019/0266253 A1* | 8/2019 | Maiti .................. G06F 11/0709 |
| 2019/0347127 A1* | 11/2019 | Coady ................. G06F 11/3442 |
| 2020/0004582 A1* | 1/2020 | Fornash ............. H04L 67/1008 |
| 2020/0057663 A1* | 2/2020 | Abbott ............... G06F 16/2228 |
| 2020/0136978 A1* | 4/2020 | Li ........................ H04L 67/148 |
| 2020/0137631 A1* | 4/2020 | Yang ...................... H04W 4/08 |

OTHER PUBLICATIONS

Meenagi Venkat; Migrate to the Cloud; Executive Summary; https://medium.com/@meenagi_venkat/migrate-to-the-clud-ce50b6de6b33; Jan. 2018; 13 pages.

* cited by examiner

SERVER-TO-CONTAINER MIGRATION

BACKGROUND

A container is a standard unit of software that packages the code of an application and its dependencies so that the application can quickly and reliably run within different computing environments. A container image is a lightweight, standalone, and executable package of software that includes everything needed to run an application: code, runtime and system tools, system libraries and settings. A container image becomes a container at runtime, where it is run on a container engine or platform. Containerized software thus runs the same, regardless of the underlying hardware infrastructure and the host operating system running on the hardware infrastructure. Containers isolate software from its operating environment, therefore ensuring that the software operates uniform regardless of environment.

DETAILED DESCRIPTION

As noted in the background section, a container permits software to uniformly run, regardless of the underlying hardware infrastructure and the host operating software running on the infrastructure. Specifically, a container engine or platform runs on the host operating system of an underlying hardware infrastructure, and the container runs on top of this platform. An example of container technology is DOCKER container technology, which provides operating system level virtualization, which can also be referred to as containerization.

Servers, including physical servers and virtual servers, can be migrated to a container platform. That is, a server can be "containerized," so that the server can become a container that runs on a container platform. Another name for a virtual server is a virtual machine. A virtual machine runs on a virtualized instance of underlying hardware infrastructure via a virtual machine manager or hypervisor.

A container differs from a virtual machine in that a container provides a way to virtualize an operating system so that multiple workloads can run on the same host operating system instance. By comparison, a virtual machine provides a way to virtualize hardware to run multiple operating system instances on the same hardware infrastructure. A container is thus run via one operating system kernel and is more lightweight than a virtual machine in that there is less processing overhead; multiple containers share the same operating system kernel, whereas multiple virtual machines have their operating system instances.

Enterprise and other large-scale computing environments, which can be referred to as or include datacenters often have a large number of diverse physical servers and virtual machines. To ensure that computing needs are satisfied, such computing environments may be overprovisioned both in hardware and software terms. Migrating these physical and virtual servers to containers can be a strategy to minimizing the cost associated with satisfying computing needs.

Techniques described herein prioritize servers for migration to containers, and can impact the actual migration process of a server to a container as well. A list of servers under consideration for migration to containers is first culled to remove from container migration consideration those servers having parameters that prohibit their migration to containers. For each remaining server, other parameters of the server are weighted to generate an overall server weight. The servers are thus ranked for migration based at least on their weights, yielding an order in which server-to-container migration is to occur. This process can include selecting the migration process by which a specific server to is to be migrated to a container, thereby affecting (and thus improving) the actual migration process of the server to a container.

Figure 1:
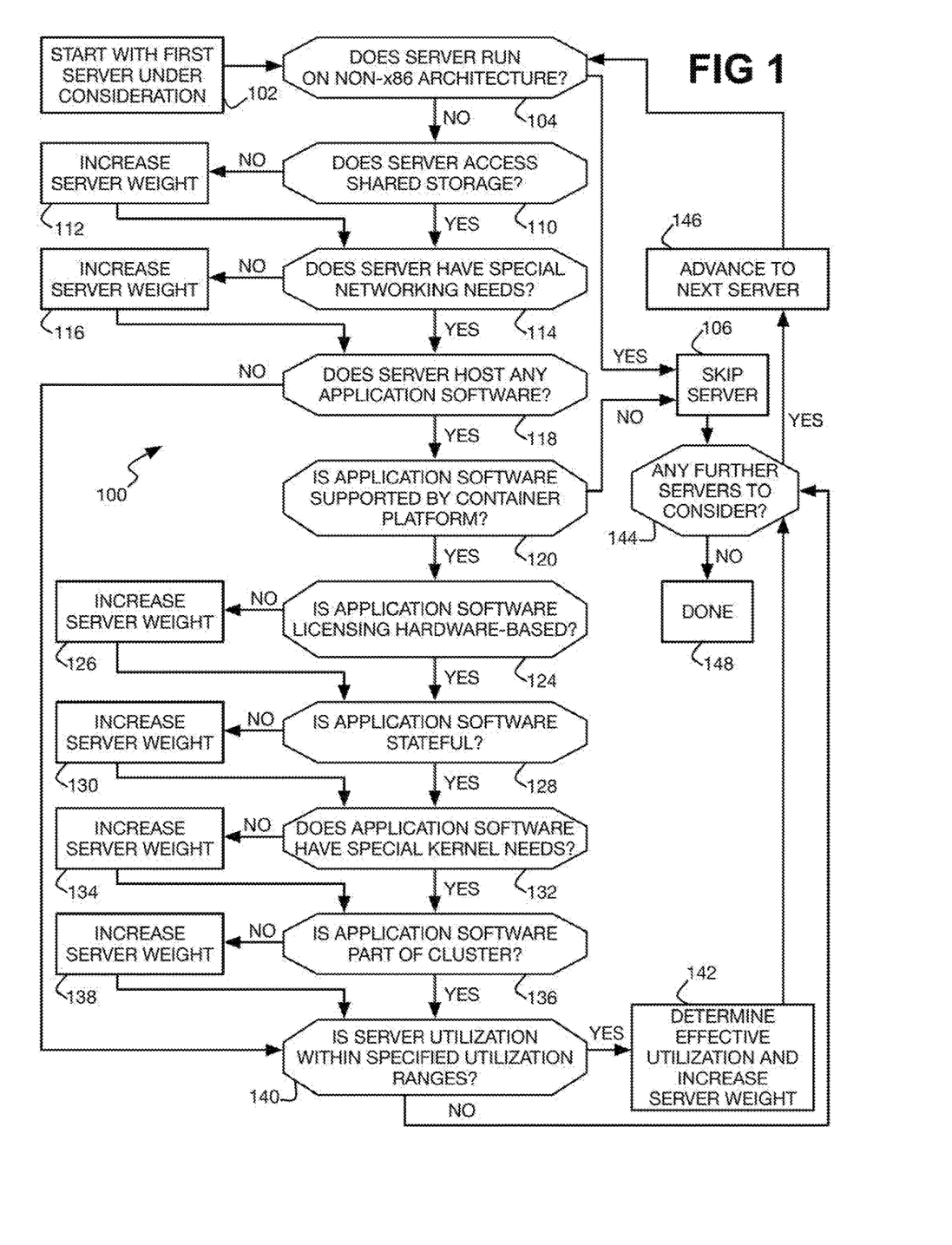
FIG. 1 is a flowchart of an example method to determine weights of servers under consideration for migration to containers.

FIG. 1 shows an example method 100 for determining the weights of servers that are under consideration for migration to containers. Each server can be a physical server, or a virtual server (i.e., a virtual machine). The method 100 may be implemented as a non-transitory computer-readable data storage medium storing program code that is executable by a processor of a computing device. The method 100 begins by starting with the first server under consideration for migration to a container (102).

The server, regardless of whether it is a physical server or a virtual server, has an underlying processor architecture. For example, the processor architecture can be a complex instruction set computing (CISC) architecture, like an x86 architecture, or a reduced instruction set computing (RISC) architecture, like a non-x86 architecture such as an ARM processor architecture. Some container platforms, such as specific types of the DOCKER container platform, support just x86 architecture-based servers. Therefore, if the server runs on a non-x86 architecture (104), the server cannot be migrated to a container, and the server is skipped from further consideration (106).

If the server does run on an x86 architecture (104), however, then additional parameters (i.e., besides the processor architecture on which the server is based) are examined. The server may have to have access to a shared storage device, such as an Internet Small Computer System Interface (iSCSI) storage device or a storage-area networking (SAN) storage device. It can be more difficult to migrate a server that has to access such a shared storage device than one that does not. Therefore, if the server does not have any special storage device needs in this respect (110), the weight of the server is increased (112), such as by a value of one, and otherwise is not increased. It is noted that the weight of each server is initially set to zero when the method 100 is first initiated.

The server may have special networking needs as well. For example, the server may be part of a private network, or require a dual stack Internet Protocol (IP) networking address. It can be more difficult to migrate a server that has such special networking needs than one that does not. Therefore, if the sever does not have any special networking needs in this respect (114), the weight of the server is increased (116), such as by a value of one, and otherwise is not increased.

A server may host application software, such as databases, middleware, and so on. A server that does not host any application software may not be favored for migration to a container, in that the server may be consider a low-value server in this respect. However, conversely, if the server does host application software, it can be migrated to a container just if the application software is supported by the container platform. Therefore, if the server hosts any application software (118), but if the application software is not supported by the container platform (120), then the server is skipped from consideration for container migration (106).

If the server does host application software, then further parameters of the server, related to the application software, may be considered. Application software can be licensed in a variety of different ways. One way in which application software can be licensed is a hardware-based licensing approach. In hardware-based licensing, application software may be tied to a particular processor, or other hardware component that has a unique identifier, such as a networking interfacing card (NIC), or even a hardware dongle. Application software that has hardware-based licensing can be more difficult to migrate to a container than application software that is not licensed in a hardware-based manner. Therefore, if the server does not host any application software that has hardware-based licensing (124), then the weight of the server is increased (126), such as by a value of one, and otherwise is not increased.

Application software can be stateful or stateless. Execution of a stateful application for a particular client maintains the current state of the client as execution proceeds. The current state is needed to continue execution of the application software for the client. By comparison, execution of a stateless application does not maintain the current state of a client as execution proceeds, and the current state is not needed to continue execution of the application software for the client. Application software that is stateful can be more difficult to migrate to a container than application software that is stateless. Therefore, if the server does not host any application software that is stateful (128), then the weight of the server is increased (130), such as by a value of one, and otherwise is not increased.

Application software can have special kernel needs. For example, application software can run in user mode or kernel mode, where the latter is also referred to as privileged mode. If the application software has to run in kernel mode, this means that the software has to have complete and unrestricted access to the underlying hardware, such as the processor and memory. By comparison, if the application software can run in user mode, this means that the software can run without directly access the underlying hardware, and instead uses application software interfaces (APIs) to access hardware. Application software that has to run in privileged mode can be more difficult to migrate to a container than application software that can run in user mode. Therefore, if the server does not host any application software that has special kernel needs in this respect (132), then the weight of the server is increased (134), such as by a value of one, and otherwise is not increased.

Application software may be part of a cluster, in that the server hosting on the application software is part of a duster of servers over which execution of the software is distributed. Clustered application software in this respect can be more difficult to migrate to a container than application software that is not clustered, because every server participating in the distributed execution of the software may have to be migrated to a container, or the container migration of any such server may otherwise have to take into account this clustering. Therefore, if the server does not host any application software that is part of a cluster in this way (136), then the weight of the server is increased (138), such as by a value of one, and otherwise is not increased.

A parameter of the server that may be considered that does not specifically pertain to its hosted application software—as the parameters considered in parts 124, 128, 132, and 136 are—is the utilization of the server. The utilization of the server can include a processor utilization rate and a memory utilization rate, among other types of utilization (e.g., networking hardware utilization). The processor utilization rate of the server is a measure of the server's average utilization of its processing resources over time, and similarly the memory utilization rate of the server is a measure of the server's average utilization of its memory resources over time.

In general, a server that under utilizes or that over utilizes its processor and/or memory resources is less favored for container migration. A server that under utilizes its resources, for instance, may not be favored for migration to a container, because the server is not sufficiently utilizing its resources, such that there may be fewer tangible benefits to migrating the server to a container. By comparison, a server that over utilizes its resources may not be favored for container migration, because such migration may overly tax the underlying hardware infrastructure of the container platform.

Therefore, a server's utilization—including each of its processor utilization rate and/or its memory utilization rate, for instance—may be compared to a specified utilization range. There may be a utilization range for the memory utilization rate and a utilization range for the processor utilization rate. These ranges may be specified by server type, or category, such as whether the server is used for development, staging, or production purposes.

For example, for a development server, the specified processor utilization range may be between 10% and 90% utilization and the specified memory utilization range may be between 25% and 85%. For a staging server, the processor utilization range may be between 30% and 70% and the memory utilization range may be between 20% and 80%. For a production server, the processor range may be between 20% and 80% and the memory range may be between 10% and 90%. In general, a given specified utilization range has a lower limit and an upper limit, which define the range.

If server utilization (either processor, memory, or both processor and memory) fall within the respective specified utilization range(s) for the type of the server (140), then an effective utilization of the server is determined and the server weight correspondingly increased (142). For each specified utilization range for the server type, there may be an associated maximum dynamic value by which the server weight can be increased, where this value may itself be policy-based. For example, a processor-centric policy may have a maximum dynamic value of 0.8 for the processor range and a maximum dynamic value of 0.3 for the memory range, This means that when processor utilization falls within the processor utilization range the server weight is increased by more than when memory utilization falls within the memory utilization range. By comparison, a memory-centric policy may have a maximum dynamic value of 0.25 for the processor range and a maximum dynamic value of 0.85 for the memory range. This means that when processor utilization falls within the processor utilization range the server weight is increased by less than when memory utilization falls within the memory utilization range.

When a particular server utilization falls within its respective specified utilization range, the weight of the server can be increased as a function of how close the utilization is to the midpoint between the lower and upper limits of the utilization range. The function may be a distribution function, such as a Gaussian distribution function having a maximum value at the midpoint and a minimum value at each of the lower and upper limits. The function may be a linear-type function, having a maximum value at the midpoint that linearly decreases towards each of the lower and upper limits.

As an example of the above, consider a server having 50% processor utilization and 30% memory utilization. The server may be a production server, such that per the example above, the associated processor utilization range is 20% to 80% and the associated memory utilization range is 10% to 90%. Therefore, both the server's processor utilization rate and the server's memory utilization rate fall within their respective associated utilization ranges. Furthermore, the processor-centric policy may be in place, such that the maximum dynamic value associated with the processor range is 0.8 and the maximum dynamic value associated with the memory range is 0.3.

Because the server's processor utilization rate and the server's memory utilization rate in this example both fall within their respective associated utilization ranges, the weight of the server is increased twice, once for processor utilization and once for memory utilization. By comparison, if just the processor utilization or just the memory utilization were within its respective range, then the weight of the server would have been increased just once. For processor utilization, the server's 50% processor utilization rate is at the midpoint between the associated processor utilization range of 20% to 80%, and therefore the weight of the server is increased by the maximum dynamic value of 0.8 under the processor-centric policy.

By comparison, the server's 30% memory utilization range is between the lower limit of 10% and the midpoint of 50% of the associated memory utilization range of 10% to 90%. Therefore, the server weight is increased, but not by the maximum dynamic value of 0.3 under the processor-centric policy. Rather, assuming a linear-type function, the server weight is increased by 0.3*(30%−10%)/(50%−10%) =0.15, or 50% of the maximum dynamic value of 0.3. That is, the 30% memory utilization rate is halfway between the midpoint of 50% and the lower limit of 10% of the associated memory utilization range, and therefore the server weight is increased by half of the maximum dynamic value, or 0.15, in addition to having been increased by 0.8 due to the processor utilization rate.

As another example in this respect, the server's memory utilization range may instead be 60%. The server weight would similarly be increased, but again not by the maximum dynamic value of 0.3 specified by the processor-centric policy in effect. Rather, still assuming a linear-type function, the server weight is increased by 0.3*(90%−60%)/(90%−50%)=0.225, or 75% of the maximum dynamic value of 0.3. This is, the 60% memory utilization rate is a quarter way between the midpoint of 50% and the upper limit of 90% of the associated memory utilization rate, and therefore the server weight is increased by 75% (100% minus a quarter, or 25%) of the maximum dynamic value, or 0.225, in addition to having been increased by 0.8 due to the processor utilization rate.

More generally, then, a given resource utilization range may have a lower limit L and an upper limit U, where MP specifies the midpoint between the limits L and U. The server utilization rate for this resource may be specified as R. The maximum dynamic value for the resource in question as specified by the policy in place may be M. Therefore, for a linear-type function, the weight of the server for this resource is, when $$L < R < U, M * \frac{R-L}{MP-L} \text{ if } M < MP, \text{ and } M * \frac{U-R}{U-MP} \text{ if } M > MP.$$

When R is outside the range—i.e., R<L or R>U—then the server weight is not increased.

The result of performing parts 110 through 142 of the method 100 yields the weight of the server, as increased in correspondence with various parameters of the server, including parameters pertaining to application software that the server hosts and including the utilization of the server, such as both memory and processor utilization in the example that has been described. The weight of the server affects its ranking when considering which server(s) to migrate to a container. However, as noted above, certain parameters, such as the processor architecture of the server being a non-86 architecture and whether the server hosts any application software that the container platform does not support, can result in skipping the server from consideration entirely.

If there are any further servers to consider for container migration (144), then the method 100 is repeated at part 104 after advancing to the next server (146) under consideration. Otherwise, the method 100 is finished (148). The method 100 thus removes from consideration any server having a parameter that precludes migration to a container, and determines a weight for every server that remains under consideration.

Figure 2:
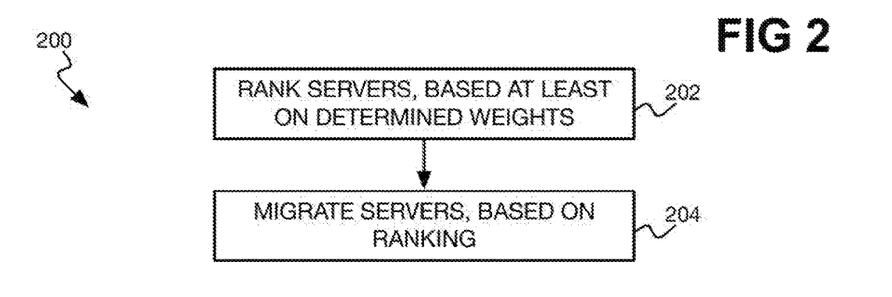
FIG. 2 is a flowchart of an example method for ranking servers based on at least their determined weights and migrating the ranked servers to containers.

FIG. 2 shows an example method 200 for migrating servers to containers. Each server can be a physical server or a virtual server (i.e., a virtual machine). The method 200, like the method 100, can be implemented as a non-transitory computer-readable data storage medium storing program code that is executable by a processor of a computing device. The method 200 can be performed after the method 100 has been performed.

The servers that remain under consideration for container migration are ranked (202). The servers remaining under consideration can be those that were not skipped in part 106 of the method 100. The servers can be ranked based at least on the server weights determined in the method 100. In one implementation, the servers can be ranked just on the basis of the server weights. That is, in this implementation, the servers are ranked in order of their determined weights, from highest server weight to lowest server weight.

In another implementation, the determined server weights may be considered as technical scores that are used in conjunction with other scores to determine the server ranking. For instance, there may be a financial score and a business score associated with each server. The financial score may indicate the cost for migrating a server to a container, whereas the business score may indicate the business value for migrating the server to a container. The financial and business scores may be manually assigned. The higher the financial score is, the less costly it is to migrate the server in question. Similarly, the higher the business score is, the greater the business value is in migrating the server in question.

In implementations in which other scores are considered in addition to the determined server weights of FIG. 1, the scores for each server may be multiplied together to generate an overall score for each server. The products of the scores are ordered from highest to lowest. Multiplication of the scores with one another ensures that servers that have a zero value for any score have the lowest ranking and thus are not migrated. For instance, a financial score of zero may indicate that it is cost prohibitive to migrate a server, whereas a business score of zero can indicate that there is no business value in migrating the server. In this implementation, the servers that were skipped in part 106 of the method 100 can have a technical score (i.e., a server weight) of zero.

One or more of the servers are then migrated, based on the determined ranking (204). For instance, the highest ranked server may be migrated first, or just the highest ranked server may be migrated. As resources to migrate servers to containers become available, the other servers may be migrated in the order in which they have been ranked.

Figure 3:
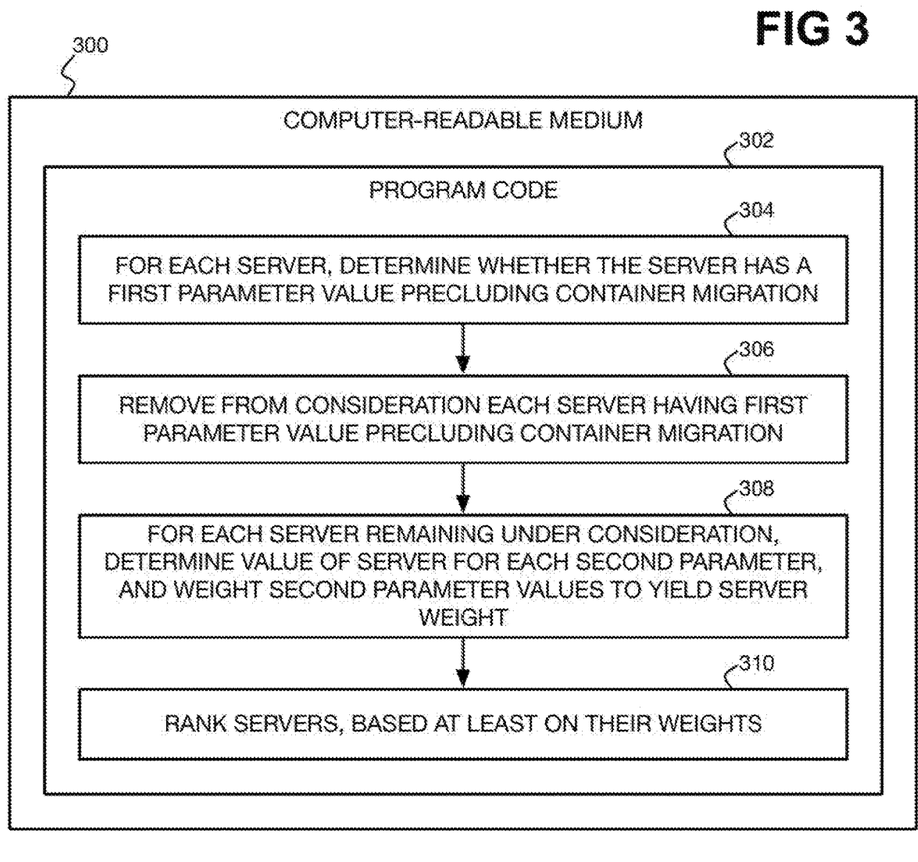
FIG. 3 is a diagram of an example non-transitory computer-readable data storage medium.

FIG. 3 shows an example non-transitory computer-readable data storage medium 300. The computer-readable data storage medium 300 stores program code 302 executable by a processor to perform processing. For each server under consideration for migration to a container, the processing includes determining whether the server has a value for a first parameter that precludes the server from being migrated to a container (304). The first parameter can be whether the server resides on a non-x86 processor architecture, for instance, as has been described above in relation to part 104 of the method 100. The value in this respect may be true or false, or the processor architecture on which the server resides. The first parameter can be whether the server hosts any application software that is not supported by the platform of the container, as has been described above in relation to part 120. The value in this respect may be true or false.

The processing includes removing from further consideration each server that has a value for the first parameter that precludes the server from being migrated to a container (306), as has been described above in relation to part 106 of the method 100. The processing includes, for each server remaining under consideration, determining the value for each of a number of second parameters, and weighting the determined second parameter values to yield a weight for the server (308). The second parameters can include whether the server accesses shared storage, per part 110 of the method 110, whether the server has special networking needs, per part 114, and server utilization, per part 140.

The second parameters can also include parameters that pertain to application software hosted by a server. Such second parameters can include whether any application software hosted by a server has hardware-based licensed, per part 124 of the method 100, and whether the application software is stateful or stateless, per part 128. The application software-related second parameters can also include whether any application hosted by a server has special kernel needs, per part 132 of the method 100, and whether the application software is clustered, per part 136.

The processing includes ranking the servers, based at least on their determined server weights (310), per part 202 of the method 200. Ranking the servers yields an order in which the servers can be migrated. The highest-ranked server within this order may be the first server that is migrated to a container, as has been described in relation to the method 200.

In one implementation, in addition to generating the weight of a server based on the second parameters in part 310, the technique, algorithm, or tool to migrate the server in question to a container may be selected and/or configured based on the second parameters. For example, there may be multiple approaches for migrating a server to a container. As another example, for a particular approach for migrating a server to a container, there may be numerous configuration values that control the migration process.

The second parameters that govern the weight of the server thus can also be employed to select and/or configure how the server is to be migrated to a container. Therefore, when the server is migrated to the container, the approach that is used is that selected and/or configured based on the second parameter values. This process improves the capabilities of the computer in performing the migration, by improving the performance of the migration process. For example, the fastest migration approach may be selected, or the migration approach may be configured so that migration occurs as quickly as possible.

Figure 4:
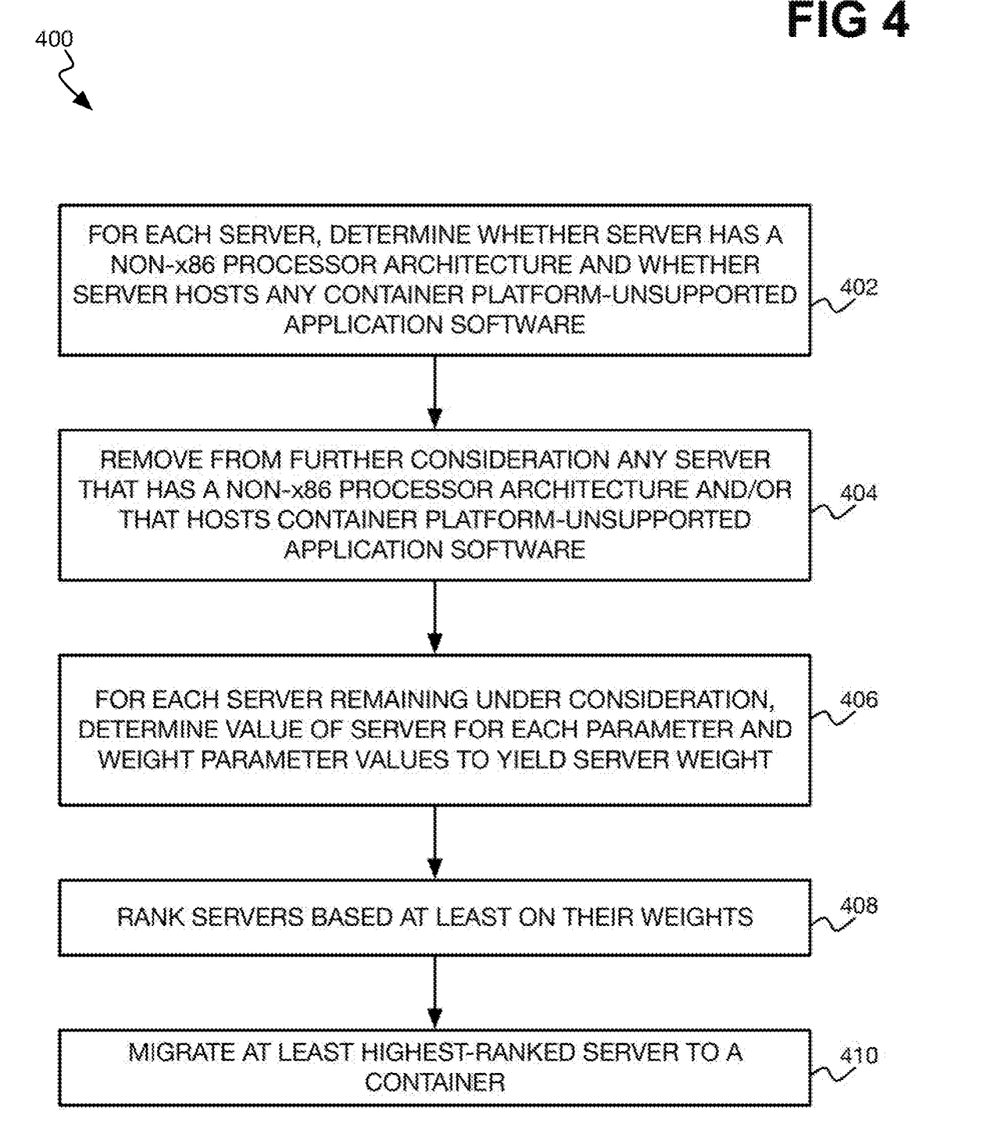
FIG. 4 is a flowchart of an example method.

FIG. 4 shows an example method 400. The method 400, like the other methods that have been described, can be performed by a processor of a computing device. The method 400 includes, for each server under consideration for migration to a container, determining whether the server has a non-x86 processor architecture and determining whether the server hosts any container software that that container platform does not support (402). Part 402 can be performed as has been described in relation to parts 104 and 118 of the method 100. The method 400 includes removing from further consideration for migration any server having a non-x86 processor architecture and/or hosting any software that is not supported by the container platform (404). Part 404 can be performed as has been described in part relation to part 106 of the method 100.

For each server remaining under consideration for migration, the method 400 determines a value of the server for each of a number of parameters, and weights the parameter values to yield a weight for the server (406). The parameter values of a serve can be the values for the second parameters that have been described in relation to parts 110, 114, 124, 128, 132, 136, and 140 of the method 100. The method 400 ranks the servers based at least on their weights (408), per part 202 of the method 200, and migrates at least the highest-ranked server to a container (410), per part 204 of the method 200.

Figure 5:
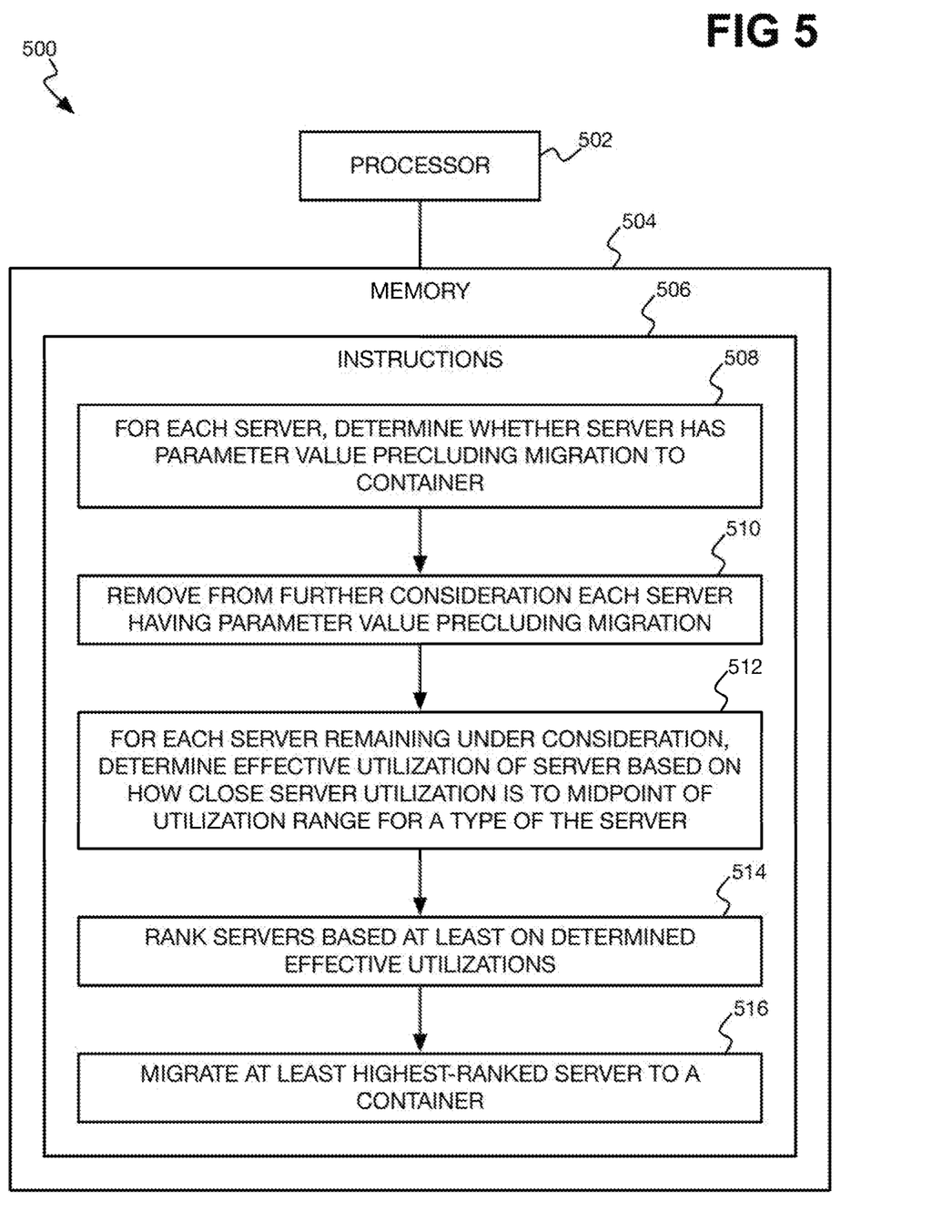
FIG. 5 is a diagram of an example computing system.

FIG. 5 shows an example computing system 500. The system 500 can be realized as a computing device, such as a server computing device, for instance. The system 500 includes a processor 502 connected to a (hardware) memory 504, and can include other components as well. The memory 504 stores instructions 506 that cause the processor 502 to perform processing.

The processing includes, for each server under consideration for migration to a container, determining whether the server has a parameter value precluding its migration to a container (508). Such a parameter value can be the value of a first parameter, as has been described in relation to parts 104 and 120 of the method 100. The processing includes removing from further consideration each server having such a parameter value that does preclude migration of the server to a container (510), per part 106 of the method 100, for instance.

The processing includes, for each server remaining under consideration, determining the effective utilization of the server based on how close the server utilization is to the midpoint of a utilization range for a type of the server (512). Part 512 can thus be implemented as has been described in relation to parts 140 and 142 of the method 100. The servers are then ranked based at least on their determined effective utilizations (514), and may also be ranked based on other (second) parameter values that can affect an overall weight of a server, as has been described in relation to part 202 of the method 200. The processing concludes by migrating at least the highest-ranked server to a container (516), per part 204 of the method 200.

Techniques have been described herein that improve server-to-container migration, at least by ranking servers under consideration for such migration in an order in which they should be migrated. Therefore, the technical process of server-to-container migration is improved, by increasing the performance of the migration process. That is, the servers that can be migrated, and that will most benefit from container migration, are those that are ranked highest. As such, if there is a limited amount of container resources available for server-to-container migration, the techniques described herein ensure optimal usage of these container resources, by selecting the servers that would best leverage these scarce resources.

We claim:

1. A non-transitory computer-readable data storage medium storing program code executable by a processor to perform processing comprising:
   for each server of a plurality of servers under consideration for migration to containers, determining whether the server has a value for a first parameter that precludes the server from being migrated to a container;
   removing from further consideration for migration to the containers each server having the value that precludes the server from being migrated;
   for each server remaining under consideration for migration, determining a value of the server for each second parameter of a plurality of second parameters including server utilization, and weighting the values of the server for the second parameters to yield a weight for the server, including, determining that the server utilization is between a lower limit and an upper limit of a specified utilization range for a type of the server, and responsively increasing the weight as a function of how close the utilization of the server is to a midpoint between the lower limit and the upper limit;
   ranking the servers remaining under consideration for migration based at least on the weights for the servers, yielding an order in which the servers are to migrated; and
   migrating a highest ranked server within the order to the container.

2. The non-transitory computer-readable data storage medium of claim 1, wherein the first parameter comprises a processor architecture of the server.

3. The non-transitory computer-readable data storage medium of claim 2, wherein determining whether the server has a value for the first parameter that precludes the server from being migrated comprises:
   determining whether the server resides on a non-x86 processor architecture, the server unable to be migrated if the server resides on the non-x86 processor architecture.

4. The non-transitory computer-readable data storage medium of claim 1, wherein the first parameter comprises application software hosted by the server.

5. The non-transitory computer-readable data storage medium of claim 4, wherein determining whether the server has a value for the first parameter that precludes the server from being migrated comprises:
   determining whether the server hosts any application software that is unsupported by a platform of the container, the server unable to be migrated if the server hosts any application software that is unsupported by the platform.

6. The non-transitory computer-readable data storage medium of claim 1, wherein the server utilization comprises a processor utilization rate of the server.

7. The non-transitory computer-readable data storage medium of claim 1, wherein the server utilization comprises a memory utilization rate of the server.

8. The non-transitory computer-readable data storage medium of claim 1, wherein the second parameters comprise server shared storage device access, and wherein weighting the values of the server for the second parameters further includes:
   increasing the weight for the server if the server does not have access to a shared storage device.

9. The non-transitory computer-readable data storage medium of claim 1, wherein the second parameters comprise server networking requirements, and wherein weighting the values of the server for the second parameters further includes:
   increasing the weight for the server if the server is not part of a private network and the server does not require a dual stack networking address.

10. The non-transitory computer-readable data storage medium of claim 1, wherein the second parameters comprise server-hosted application software, and wherein weighting the values of the server for the second parameters further includes:
    increasing the weight for the server if the server does not host any application software.

11. The non-transitory computer-readable data storage medium of claim 1, wherein the second parameters comprise hardware-based application licensing, and wherein weighting the values of the server for the second parameters further includes:
    increasing the weight for the server if the server does not host any application that has hardware-based application licensing.

12. The non-transitory computer-readable data storage medium of claim 1, wherein the second parameters comprise application statefulness, and wherein weighting the values of the server for the second parameters further includes:
    increasing the weight for the server if the server does not host any application that is stateful.

13. The non-transitory computer-readable data storage medium of claim 1, wherein the second parameters comprise kernel requirements, and wherein weighting the values of the server for the second parameters further includes:
    increasing the weight for the server if the server does not host any application that has to run in privileged mode.

14. The non-transitory computer-readable data storage medium of claim 1, wherein the second parameters comprise application clustering, and wherein weighting the values of the server for the second parameters further includes:
    increasing the weight for the server if the server does not host any application that is part of a cluster.

15. The non-transitory computer-readable data storage medium of claim 1, wherein each server comprises a physical server or a virtual machine.

16. A method comprising:
    for each server of a plurality of servers under consideration for migration to containers, determining, by a computing device, whether the server has a non-x86 processor architecture and determining whether the server hosts any application software unsupported by a container platform;
    removing, by the processor, from further consideration for migration to the containers any server that has the non-x86 processor architecture and any server that hosts any application software unsupported by the container platform;

for each server remaining under consideration, determining, by the processor, a value of the server for each parameter of a plurality of parameters including server utilization, and weighting the values of the server for the parameters to yield a weight for the server, including, determining that the server utilization is between a lower limit and an upper limit of a specified utilization range for a type of the server, and responsively increasing the weight as a function of how close the utilization of the server is to a midpoint between the lower limit and the upper limit;

ranking, by the processor, the servers remaining under consideration for migration based at least on the weights for the servers; and migrating, by the processor, a highest-ranked server to a container.

17. The method of claim 16, wherein the parameters comprise server networking requirements, and wherein weighting the values of the server for the parameters comprises:

increasing the weight for the server if the server is not part of a private network and the server does not require a dual stack networking address.

18. The method of claim 16, wherein the parameters comprise server shared storage device access, and wherein weighting the values of the server for the parameters further includes:

increasing the weight for the server if the server does not have access to a shared storage device.

19. The method of claim 16, wherein the parameters comprise server-hosted application software, and wherein weighting the values of the server for the parameters further includes:

increasing the weight for the server if the server does not host any application software.

20. A system comprising:

a processor; and a memory storing instructions executable by the processor to:

for each server of a plurality of servers under consideration for migration to containers, determine whether the server has a value for a parameter that precludes the server from being migrated to a container;

remove from further consideration for migration to the containers each server having the value that precludes the server from being migrated;

for each server remaining under consideration for migration, determine an effective utilization of the server based on how close a utilization of the server is to a midpoint between a lower limit and an upper limit of a specified utilization range for a type of the server; and rank the servers remaining under consideration for migration based at least on the effective utilizations of the servers; and migrate a highest-ranked server to a container.

* * * * *